United States Patent [19]

Kayser

[11] Patent Number: 5,382,475

[45] Date of Patent: Jan. 17, 1995

[54] PIGMENTED ALGAE-RESISTANT GRANULAR MATERIALS AND COMPOSITES SHEETS INCLUDING SAME

[75] Inventor: Mark H. Kayser, Woodbury, Minn.

[73] Assignee: Minnesota Mining and Manufacturing Company, St. Paul, Minn.

[21] Appl. No.: 945,127

[22] Filed: Sep. 15, 1992

[51] Int. Cl.$^6$ ............................................. B32B 5/16
[52] U.S. Cl. ................................. 428/403; 428/404; 428/689; 428/699; 428/701; 428/702
[58] Field of Search ............... 428/404, 689, 699, 701, 428/702, 403, 143, 213, 328; 501/6, 100, 127, 132, 134, 153, 154

[56] References Cited

U.S. PATENT DOCUMENTS

| | | | |
|---|---|---|---|
| 1,720,708 | 4/1922 | Young | 428/549 |
| 2,001,448 | 5/1935 | Beasley | 428/404 |
| 2,054,317 | 9/1936 | Gundlach | 428/404 X |
| 2,070,359 | 2/1937 | Hillers | 428/144 |
| 2,111,131 | 3/1938 | Weygrandt | 106/635 |
| 2,120,773 | 6/1938 | Wright | 428/404 |
| 2,225,867 | 12/1940 | Hurd | 424/635 |
| 2,981,636 | 2/1957 | Lodge et al. | 428/404 |
| 3,046,188 | 7/1962 | Gaudian et al. | 424/632 |
| 3,255,031 | 6/1966 | Lodge et al. | 428/145 |
| 3,420,690 | 1/1969 | Beyard et al. | 428/404 X |
| 3,479,201 | 11/1969 | Sloan | 428/404 X |
| 3,484,267 | 12/1969 | Salder, III | 52/518 |
| 3,507,676 | 4/1970 | McMahon | 428/145 |
| 3,528,842 | 9/1970 | Skadulis | 428/145 |
| 3,598,627 | 8/1971 | Klimboff | 52/518 |
| 3,752,696 | 8/1973 | Beyard et al. | 428/407 X |
| 3,826,825 | 7/1974 | Dowd et al. | 424/641 |
| 3,888,176 | 6/1975 | Horai et al. | 106/18.36 |
| 3,888,682 | 6/1975 | Nelson | 106/18.35 |
| 3,888,683 | 6/1975 | Horai et al. | 106/18.35 |
| 3,888,684 | 6/1975 | Little | 106/18.35 |
| 3,894,877 | 7/1975 | Nelson | 106/18 |
| 3,985,540 | 10/1976 | Fein et al. | 504/152 |
| 4,092,441 | 5/1978 | Meyer et al. | 428/145 X |
| 4,359,505 | 11/1982 | Joodicke | 428/404 |
| 4,378,408 | 3/1983 | Joodicke | 428/403 |

OTHER PUBLICATIONS

Kirk–Othmer, *Encyclopedia of Chemica Technology*, vol. 24, 3rd Ed., John Wiley & Sons (New York) pp. 854–863.

Primary Examiner—Paul J. Thibodeau
Assistant Examiner—H. Thi Lê
Attorney, Agent, or Firm—Gary L. Griswold; Walter N. Kirn; Jeffrey L. Wendt

[57] ABSTRACT

Long-term algicidal granules show improved color fastness over previously known granules. The granules have a ceramic coating comprising three layers, the first two of which have a copper compound such as cuprous oxide therein at relatively equal amounts. The ceramic coating further includes a third layer having pigment, a borate compound, and zinc oxide having an average particle size less than about 0.13 micrometer. In particular it has been found that the use of cuprous oxide allows conversion to black cupric oxide, which is more insoluble than cuprous oxide and black in color, allowing the algae-resistant granules to retain their original color for loger periods of time under weathering conditions. Methods of producing such ceramic-coated granular materials are also disclosed.

12 Claims, No Drawings

PIGMENTED ALGAE-RESISTANT GRANULAR MATERIALS AND COMPOSITES SHEETS INCLUDING SAME

CROSS REFERENCE TO RELATED APPLICATIONS

This application may be related to assignee's copending application Ser. Nos. 07/945,128, filed Sep. 15, 1992, and 07/909,068, filed Jul. 2, 1992.

BACKGROUND OF THE INVENTION

1. Field of the Invention

This invention relates to pigmented algae-resistant inorganic granules which match the color of non-algae-resistant inorganic granules to the extent that the difference between the color of the algae-resistant and non-algae-resistant granules cannot be visually detected.

2. Description of Related Art

Roofing granules, both natural and artificially color-coated, find extremely wide use in roofing and siding materials. Important applications are in granular surfaced bituminous roll roofing and asphalt shingles. The granules, which are partially embedded in one surface of asphalt-impregnated and/or asphalt-coated fiber sheet material, form a coating to provide an inherently weather-resistant, fire-resistant, and decorative exterior surface. "Weather-resistant" as used herein includes ultraviolet (UV) radiation-resistant.

Skadulis (U.S. Pat. No. 3,528,842) describes roofing granules which contain an algicide, such as cuprous oxide. As explained by Skadulis, methods have long been known to artificially color roofing granules. This consists primarily of utilizing crushed and screened minerals, in which the granules are coated with a suitable pigment in an inorganic matrix or bond. The bond is usually applied in the form of a soluble silicate solution and is insolubilized either by heat treatment or a combination of heat treatment and chemical action to a substantially water-insoluble state and is strongly adherent to the base granule. In carrying out these methods the pigment is typically uniformly applied to the granular surface with the soluble silicate solution. The soluble silicate binder is converted to an insoluble state by heat treatment and chemical action, as by the addition of clay or an acidic material. This can occur either before, during or after the application of the mixture of the soluble silicate and pigment to the mineral granules, in order to obtain a chemical reaction between the clay or acidic material and the alkaline portion of the silicate.

Skadulis notes that numerous organic chemicals have been used to control or prevent the growth of fungi and algae. Such chemicals cannot, however, be applied to granules before firing because they would be volatilized during firing of the granules and rendered ineffective. Thus, the roofing granule industry has turned to inorganic algicidal compounds such as copper sulfate ($CuSO_4$) cupric oxide ($Cu_2O$), silver iodine (AgI) and lead phosphate $Pb_3(PO_4)_2$. However, in the case of copper sulfate, the substance is too water soluble and would be leached out of a surface by rainfall and other naturally occurring moisture within a few months. On the other hand, virtually water insoluble compounds such as cupric oxide, silver iodine and lead phosphate proved ineffective due to reasons which were not fully understood but were believed to be insufficient solubility of the materials.

To overcome these problems, Skadulis discovered that substantially water-insoluble copper compounds which had limited solubility in acidic solutions, such as cupric oxide ($Cu_2O$) or cupric bromide ($CuBr_2$) in porous ceramic coatings proved surprisingly effective in maintaining surfaces coated therewith free of algae infestations for long periods of time when incorporated in the coating compositions in very minor amounts. Skadulis notes that in the case of algae-resistant roofing granules, roofs may be made up from shingles coated wholly with such granules or the algae-resistant granules may be mixed or blended with conventional (non-algicidal) granules. However, the color-fastness of algae-resistant and non-algae-resistant granules has been determined to vary, so that after a period of time the end user may still be faced with the prospect of a roof which changes color as it matures, with or without algae growth and its attendant problems. It would be advantageous if algae-resistant granules could be made to have a visual appearance which is indistinguishable from the non-algae-resistant inorganic granules. The present invention is drawn to such algae-resistant inorganic granules, a composite sheet body for roofing and siding which includes such granules, a color-coating composition suitable for preparing algae-resistant insolubilized and unglazed artificially colored coatings, and a method of protecting exterior surfacing from the growth thereon of discoloring microorganisms.

McMahon (U.S. Pat. No. 3,507,676) further describes zinc-compound containing algicidal surfacing granules. The roofing granules contain either zinc metal, zinc oxide (ZnO), or zinc sulfide (ZnS), rather than copper-containing compounds patented by Skadulis. McMahon teaches the use of a pigment grade ZnO in either a first or second coating, with a concentration of about 10 grams ("gms") ZnO per kilogram ("kg") of inorganic roofing granules. McMahon noted that ZnO had been previously used in pigmented ganules as an insolubilization agent or pigment, but in quantities insufficient to be useful for long-term algae-resistance.

Lodge et al. (U.S. Pat. No. 3,255,031) describes the use of a small amount of a borate, such as "borax" and the like, in clay-silicate coating compositions. The addition of about 2 gms borate per kg of inorganic granules apparently allows the temperature of the firing kiln to be reduced below about 450° C., and results in a granule which does not have to be treated with pickling agents to insolubilize the coating. Color benefits such as "lightening" of all pigmented granules and "whitening" of dark-pigmented granules are derived from the use of borate-clay-silicate coatings. Borates are disclosed as being used in a single coating or in the inner or outer coating of a two layer coating system. Skadulis and McMahon also mention that borates may be used in the processes of making their coating formulations.

U.S. Pat. No. 3,888,684 (Little) describes algicidal roofing granules having two fully water-insolubilized silicate-clay coatings each containing algicidal compounds, with the inner insolubilized coating have a greater algicidal content than the outer insolubilized coating. The algicidal compounds employed are zinc algicidals, copper algicidals or mixtures thereof.

As noted by Nelson in U.S. Pat. Nos. 3,894,877 and 3,888,682, the unavailability of a totally satisfactory algicidal roofing granule reflects the continual desire in the roofing industry for a more effective algicidal effect from a roofing granule of ever diminishing incremental cost to achieve such an effect. The use of minimum quantities of metallic algicide to produce a desired level of effectiveness over an extended period of time is, therefore, highly desirable. Nelson also notes that the use of a relatively large amount of metallic algicide frequently requires the incorporation of pigment in the granule coating in amounts in excess of that otherwise required to achieve a desired roofing granule color. Nelson gives an example, that as the amount of cupric oxide employed is increased, the amount of titanium dioxide pigment that must be employed in the granular coating composition to produce a white roofing granule is also generally increased, adding to the overall cost of the algicidal roofing granule. Nelson also notes that a further troublesome aspect of efforts to impart algicidal properties to roofing granules has been the practical necessity for producing such algicidal roofing granules as a separate production operation apart from the production of conventional-non-algicidal, color-coated roofing granules because of the variation in the color coating formulations necessarily required to incorporate the algicidal compound into the color coating. Nelson maintains that the requirements for the production of algicidal roofing granules in accordance with the teachings of Skadulis and McMahon constitute a further detrimental element serving to diminish the prospects for employing algicidal roofing granules despite the genuine need for algae control.

Thus, the Nelson patent was drawn in large part to a process whereby conventional non-algicidal color-coated roofing granules are treated with a mixture of a heavy processing oil and a copper silicate, alone or in combination with other metallic algicides, to provide algicidal colored roofing granules. The algicidal materials are applied, according to the Nelson process, to conventionally color-coated granules by incorporation into the heavy processing oil that is mixed with the color-coated granules, as in conventional post-treatment operations in which lighter processing oils are generally employed, for example, to reduce dust generation when processing the granules. Nelson notes that heavy oils are commonly dark in appearance, and such oils would ordinarily be deemed inappropriate for application to color coded roofing granules as likely tending to mask or adversely effect the desired color of the color coating. However, the use of heavy oils apparently enhanced the adhesion of the algicidal materials to the surface of the granules, minimizing any tendency for loss of algicidal materials from the roofing granules due to wash-off or fall-off of particles as a result of atmospheric weathering or any other cause. Thus, algicidal properties were enhanced, but the problem of matching the color of algicidal and non-algicidal granules remains.

U.S. Pat. Nos. 3,888,176 and 3,888,683 (Horai, Jr. et al.) describe particles similar to those of Nelson which are made by incorporating metallic algicides with the processing oils conventionally employed in the post-treatment of color-coated roofing granules for dust control, i.e., those oils have a viscosity of about 100-500 SUS measured at 100° F.

U.S. Pat. No. 4,092,441 (Myer et al.) discloses a roofing granule treatment process whereby metallic algicides, such as zinc and copper, are sprayed in the form of droplets of molten metal onto the surface of roofing granules or onto the surface of asphalt roofing compositions in which said granules are imbedded. The metal droplets solidify and adhere on the surface of the granules or compositions as relatively fine, randomly distributed, irregular shaped metal globules. During periods of rain or dew upon atmospheric exposure of roofing compositions incorporating therein roofing granules so treated, the oxidized globules become ionized so that metallic algicidal ions are slowly released therefrom and leached over the roofing surface, thus retarding the biological growth of algae and/or fungi over extended periods of time.

Other U.S. Patents of interest include U.S. Pat. Nos. 3,598,627; 3,484,267; 2,111,131; 2,225,867; 3,826,825; 2,981,636; 4,378,408; 4,359,505; 2,070,359; 3,752,696; 3,046,188; 1,720,708; and 3,985,540.

In particular, U.S. Pat. No. 2,111,131 discloses that small but highly effective amounts of zinc oxide may be dissolved in sodium silicate by effecting the dissolution at elevated temperatures and pressures, such as by introducing steam into an autoclave conataining zinc oxide and the silicate. U.S. Pat. No. 2,225,867 discloses that the algicidal effectiveness of copper oxides (especially cuprous oxide) is increased by the presence of Zinc oxide, and that it did not appear to be dependent upon the purity, source, and the like, of the zinc oxide.

Minnesota Mining and Manufacturing Company ("3M") has commercialized since 1990 pigmented roofing granules known under the trade designations "LR-7000" and "LR-7070". These granules have three insolubilized silicate-clay coatings, the first two coatings each having about 35 gm cuprous oxide per kg substrate granules, with the third coating having no cuprous oxide but having pigments to render the desired color. None of the three coatings contains zinc oxide or borate. Assignee's copending application Ser. No. 07/945,128, filed Sep. 15, 1992, describes algicidal and non-algicidal roofing granules similar to the LR-7000 granules, improved by the addition of zinc oxide made by the "French process" in substantially equal proportions to the first and second coatings, and zinc oxide and borate in the third coating. (Zinc oxide made the French process differs from zinc oxide manufacturesd by the "American process". The difference is discussed in the copending application in detail with reference to Kirk-Othmer, *Encyclopedia of Chemical Technology*, Vol. 24, 3rd Ed. John Wiley & Sons (New York) pp. 854–863. Surprisingly, the granules of the copending application exhibit improved akalinity and adhesion properties over previously known granules employing other grades of zinc oxide, such as pigment grade zinc oxide.

As mentioned above, there still exists, however, even with the improved granules of the above-mentioned copending application, the long standing problems of extending the algae-resistance of roofing granules, color matching algicidal and non-algicidal roofing granules, and reducing the tendency for pigmented algae-resistant granules to color-fade. Therefore, it would be advantageous if pigmented algicidal roofing granules could be developed which meet these long-felt needs.

SUMMARY OF THE INVENTION

In accordance with the present invention pigmented, algae-resistant granules are provided which exhibit long-term (greater than 10 years algae resistance and/or algae killing ability).

The inventive granules have, in one preferred embodiment, an inorganic substrate granule and a ceramic coating, the ceramic coating comprising:

(a) a first ceramic layer comprising the reaction product of an alkali metal silicate and a high temperature reactive aluminosilicate, cuprous oxide, and cupric oxide, said cuprous oxide present in an amount ranging from about 20 grams to about 30 grams per kilogram of the substrate granules, and said cupric oxide present in an amount ranging from about 5 to about 10 grams per kilogram of the substrate granules;

(b) a second ceramic layer substantially the same thickness as the first ceramic layer and comprising the reaction product of an alkali metal silicate and a high temperature reactive aluminosilicate, cuprous oxide, and cupric oxide, the cuprous oxide present in an amount ranging from about 20 grams to about 30 grams per kilogram of the substrate granules, the cupric oxide present in an amount ranging from about 5 to about 10 grams per kilogram of the substrate granules; and c) a third ceramic layer having a thickness which is approximately 0.25 to 0.5 times as thick as each of the first and second ceramic layers and comprising the reaction product of an alkali metal silicate and a second reactive aluminosilicate which is more reactive with alkaline metal silicates than said high temperature aluminosilicate, from about 1 to about 5 grams zinc oxide per kilogram of the substrate granules having an average particle size less than about 0.13 micrometer, a borate compound having approximately the same concentration as the zinc oxide, and a pigment present in sufficient amount to provide said granule with an initial $L^*a^*b^*$ delta compared with a standard non-algae-resistant granule of no more than about $+/-0.5$.

In another embodiment, the first and second ceramic layers each contain a copper sulfate selected from cuprous sulfate, cupric sulfate pentahydrate, or a mixture thereof. The copper sulfate is typically and preferably present in an amount ranging from about 10 to about 40 grams per kilogram of inorganic substrate granules.

The pigmented algae-resistant granules of the invention, by having "an $L^*a^*b^*$ delta compared with a standard non-algae-resistant granule of no more than about $+/-0.5$", exhibit color which is indistinguishable by the human eye from non-algicidal granules. The $L^*a^*b^*$ color space test is discussed in greater detail in the Test Methods. Briefly, a sample of colored, deoiled granules is placed in an instrument fitted with a defined light source and the reflectance from the sample recorded on three different color scales: "$L^*$", which is lightness-darkness, and which ranges from 0 to $+100$; "$a^*$" which is red-green, and ranges from $-100$ to $+100$; and "$b^*$" which is yellow-blue, and which also ranges from $-100$ to $+100$. "Delta" refers to the difference between values for two different samples tested on the same instrument under standard conditions.

Target values for black granules of the invention are $L^*=21.4$, $a^*=-0.01$, and $b^*=-0.68$, while target values for brown granules of the invention are $L^*=38.9$, $a^*=12.4$, and $b^*=16.7$.

The pigmented algae-resistant granules of the invention have in the third ceramic coating sufficient amounts of zinc oxide and borate compound to yield a less porous and thus more chemically durable coating, providing a timed release algicidal effect. In addition, the adhesion of the granules to an asphalt roofing substrate, as taught in copending application Ser. No. 07/945,128, is improved over granules not having the zinc oxide/borate compound in the third coating. However, the presence of cuprous oxide in the first and second coatings, and borate compound and zinc oxide in the third coating, produce a slight but noticeable (to the human eye) color change. It is one aspect of the invention to overcome this color change, without raising production costs for algicidal granules.

In addition, granules of the invention have also been found to exhibit a change in $L^*$ of less than about 2.0 in an 80 minute oxidation test, which was surprising in light of comparative testing of non-algae-resistant granules. This increased color retention (otherwise refered to in the art as "fade-resistance") has been found by the inventor herein to be attributable to conversion of cuprous oxide to cupric oxide in the first and second coatings after firing (heating) the granules to about 510° C. the percent conversion having been determined to be about 20 percent by weight, $+/-5$ percent. This conversion has been verified by x-ray diffraction analysis. Therefore, the granules of the present invention are particularly well suited to producing dark (brown and black) colored granules.

Although cupric oxide is less effective than cuprous oxide for algae-resistance, the advantage of being able to more easily color-match the granules of the invention with their non-algae-resistant counterparts is a distinct, nonobvious advantage over prior art granules. Cupric oxide is black in color, only very slightly soluble in water, and thus is a more permanent black pigment than carbon black. Cupric oxide thus serves to increase the color-fastness (or fade-resistance) of the pigmented coatings.

The 80 minute oxidation test is also described in detail in the Test Methods section. Briefly, the granules are placed reduced pressure chamber and a stream of oxygen is flowed across them. The time that the sample is expose to the oxygen in the chamber is recorded, and the $L^*$ of the sample measured at various times and after a total of 80 minutes. The change in $L^*$ from $t=0$ to $t=80$ minutes is preferably zero.

A further aspect of the invention comprises a composite sheet suitable for roofing or siding comprising a bituminous sheet material having a firmly adherent surfacing of granules at least a portion of which are pigmented algicidal granules of the invention described above.

Another aspect of the invention relates to a method of making pigmented algicidal granules which exhibit an initial $L^*a^*b^*$ color space delta of no more than about $+/-0.5$ for $L^*$, $a^*$, and $b^*$, and which includes an inorganic substrate granule and a ceramic coating, said method comprising the steps of:

(a) providing a first slurry by combining an alkali metal silicate, a high temperature reactive aluminosilicate, an algicidal amount of cuprous oxide, and a sufficient amount of water to render the slurry coatable onto granules, the high-temperature reactive aluminosilicate at least partially reactive with the alkali metal silicate, the slurry being roughly at room temperature;

(b) preheating a plurality of inorganic substrate granules to about 125°-140° C.;

(c) coating said first slurry onto the substrate granules of step (b) to form a plurality of first slurry-coated inorganic substrate granules at a temperature of about 50°-70° C.;

(d) heating the first slurry-coated inorganic substrate granules in an atmosphere for a time and at a temperature sufficient to form a plurality of first ceramic-coated inorganic granules in which from about 5 to 30% of the cuprous oxide is converted to cupric oxide;

(e) allowing the first ceramic-coated inorganic granules to reach a temperature ranging from about 125° C. to about 140° C.;

(f) repeating steps a–d to provide a second ceramic-coated inorganic granule;

(g) allowing the second ceramic-coated inorganic granule to reach a temperature ranging from about 110°–120° C.;

(h) providing a second coatable slurry by combining an alkali metal silicate, a second reactive aluminosilicate which is more reactive with alkali metal silicates than the high temperature aluminosilicate, a borate compound, and zinc oxide having an average particle size less than about 0.13 micrometer, and a sufficient amount of water to render the second slurry coatable onto granules, the second aluminosilicate at least partially reactive with the alkali metal silicate, the second slurry being roughly at room temperature;

(i) coating the second-ceramic coated inorganic granule with the second slurry to form a plurality of second slurry-coated inorganic granules at a temperture of about 50°–70° C.; and (j) heating the second slurry-coated inorganic granules for a time and at a temperature sufficient to form a plurality of third ceramic-coated inorganic granules.

Roofing granules made in accordance with the teachings of the invention enable the interchangeable use of both algae-resistant and non-algae-resistant roofing granules in roofing granules blends without visual detection by humans of either type of granule. In addition, the granules of the invention exhibit excellent fade-resistance.

Further advantages of the invention will be determined by reading the description of preferred embodiments which follows.

DESCRIPTION OF PREFERRED EMBODIMENTS

Pigmented Algicidal Granules

As used herein the term "granular material" is used broadly and is intended to mean particles having a diameter ranging from about 425 to about 1600 micrometers. The terms "algicidal" and "algae-resistant" when referring to granules or chemicals means granules or chemicals having the capability to kill or inhibit the growth of algae commonly associated with causing discoloration of roofs and other surfaces. McMahon (U.S. Pat. No. 3,507,676) identified the dominant organism causing such discolorization as the alga *Gloeocapsa magma*. Several other strains of algae along with some fungi are also considered to be covered by the terms "algicidal" and "algae-resistant."

The preferred algicidal component of the pigmented algicidal granules of the invention is cuprous oxide ($Cu_2O$), which oxidizes to the more algicidal cupric oxide (CuO). There appear to be three colors of cuprous oxide known in the art: red, yellow, and purple. There is no preference to any of these in the present invention, although, of course, when a dark colored granule is desired one would preferably use the purple version.

The amounts of cuprous and cupric oxides in each of the first and second ceramic coatings is a critical aspect of the invention. The amount of cuprous oxide in each of the first and second ceramic coatings may range from about 30 to about 40 grams per kilogram of inorganic substrate granule, more prefereably from about 34 to about 36 grams per kilogram. The fact that the first and second ceramic coatings have about the same amount of cuprous oxide allows for optimizing the process of supplying the granules with algicide, since the amount of algicide does not have to be changed between the first and second coating steps. Algicidal granules having a more uniform release of algicide from their exposed surface (i.e, that portion of the granule not adhered to a surface but exposed to the environment) are achieved by this procedure.

The amount of cupric oxide preferably ranges from about 5 to about 10 grams per kilogram substrate granules (about 20% conversion of cuprous oxide to cupric oxide).

The zinc oxide amount and average particle size, and the amount of borate compound, in the third ceramic coating are less critical aspects of the invention. As explained more fully in copending Ser. No. 07/909,068, filed Jul. 2, 1992, the combination of zinc oxide having very small average particle size with borate compounds such as borax, $Na_2B_4O_7.10H_2O$, in roughly equal weight percentages, allows the attainment of low initial alkalinity granules. Further, the alkalinity stays at a low value for a longer time when zinc oxide and borate compounds are used in the third coating of the granules described herein. Adhesion to bituminous asphalt is also improved. Zinc oxide is typically and preferably present in the third ceramic coating at an amount ranging from about 1.0 grams to about 5.0 grams per kilogram substrate granules. It is not necessary for the borate compound to be present in the exact amount that the zinc oxide is present; in fact, the zinc oxide/borate compound weight ratio can vary between about 1.0:1 and about 2.0:1. Most preferably the ratio is about 1.5:1. A preferred inorganic granule in accordance with the invention is that wherein the borate compound is present at at least 0.5 grams per kilogram of substrate granules but at no case more than about 2.5 grams per kilogram of substrate granules, and wherein the zinc oxide is present at at least 0.5 grams per kilogram of substrate granules but at no case more than about 2.5 grams per kilogram of substrate granules.

The preferred borate compound is borax; however, other borates may be utilized, such as zinc borate, sodium fluoroborate, calcium borate, and colemanite. Another alternative borate compound is sodium obtained by heating waste borosilicate glass to a temperature sufficient to dehydrate the glass.

The inorganic substrate material of the granular materials of the invention are conventional and may be selected from any one of a rather wide class of relatively porous and weather resistant rocks, minerals, or recycled materials. Examples of relatively porous materials are trap rocks and slates. Examples of relatively non-porous rocks or minerals are argillite or greystone (such as the large greystone deposits located north of Wausau, Wis.), greenstone, nepheline syenite certain granites and the like. Normally, it is preferred to employ the relatively non-porous rocks, although even these rocks have a substantial porosity as compared to the ceramic coating on the inorganic substrates.

Aqueous sodium silicate is the preferred alkali metal silicate due to its availability and economy, although equivalent materials such as potassium silicate may also be used. The alkali metal silicate may be designated as $M_2O:SiO_2$, where M represents an alkali metal such as sodium (Na), potassium (K), mixture of sodium and potassium, and the like. The mole ratio of $SiO_2$ to $M_2O$ preferably ranges from about 1.4:1 to about 3.75. Ratios of 2.75:1 and 3.22:1 are particularly preferred, depending on the color of the granular material to be produced, the former preferred when light colored granules are produced, while the latter is preferred when dark colored granules are desired.

The high temperature reactive aluminosilicate used in the first and second ceramic coatings is preferably a clay having the formula $Al_2Si_2O_5(OH)_4$. Another preferred high temperature reactive aluminosilicate is kaolin, $Al_2O_3 \cdot 2SiO_2 \cdot 2H_2O$, and its derivatives formed either by weathering (kaolinite), by moderate heating (dickite), or by hypogene processes (nakrite). The particle size of the clay is not critical to the invention, however, it is preferred that the clay contain not more than about 0.5 percent coarse particles (particles greater than about 0.002 millimeter in diameter).

The aluminosilicate used in the third ceramic coating differs from the high temperature reactive aluminosilicate clays used in the first and second ceramic coatings. The aluminosilicate used in the third ceramic coating is more reactive than kaolin or its derivatives, allowing the third coating to be fired in less time, thus exposing the third coating to the kiln combustion gases for a shorter period of time. As combustion gases typically contain oxygen, which might oxidize cuprous oxide to cupric oxide, it is important to expose the third coating to kiln conditions which render the desired conversion of cuprous to cupric oxide. One commercially available and useful aluminosilicate clay for use in the third coating of the granules in the present invention are the aluminosilicates known under the trade designations "Dover" from W. R. Grace Chemical Company, McIntyre, Ga., having composition $Al_2(Si_2O_5)(OH)_4$.

Pigments useful in the invention include carbon black, titanium dioxide, chromium oxide, yellow iron oxide, phthalocyanine green and blue, ultramarine blue, red iron oxide, metal ferrites, and mixtures of these. One preferred pigmented algicidal granule is a black granule wherein the pigment consists essentially of a mixture of two carbon blacks and chromium oxide, the first carbon black having an average particle size ranging from about 50 to 100 nanometers, more preferably form 70 to 80 nanometers, and the second having an average particle size ranging from about 15 to 50 nanometers, more preferably form about 20 to 30 nanometers. In these black granules the total amount of carbon black preferably ranges from about 1.0 to 2.0 grams per kilogram substrate granules, with the weight ratio of larger particle size to smaller particle size carbon blacks ranging from about 3.0 to 5.0. The amount of chromium oxide may range from about 1.25 to about 1.75 grams per kilogram substrate granules. One carbon black having a particle size of 25 nanometers is known under the trade designation "Black Pearls 490". A carbon black having a particle size of 75 nanometers is known under the trade designation "Black Pearls 130". Both are available from the Cabot Corporation.

A dispersant is typically and preferably used to disperse the carbon black or other fine particle size pigments used in the invention. One such dispersant is the sodium salt of sulfonated naphthalene-formaldehyde condensate known under the trade designation "Blancol N", available from Rhone-Poulenc Surfactants & Specialties, Cranbury, N.J. The dispersant is typically used in an amount ranging from about 0.01 to about 1.0 gram per kilogram of substrate granules. When a mixture of carbon blacks is used, as described above, the amount of dispersant more preferably ranges from about 0.03 to about 0.1 gram per kilogram substrate granules.

Prior to their use on bituminous sheet materials, the pigmented algicidal granules of the invention may be post-treated to reduce dust generation during processing and to improve adhesion to the materials used in such sheets, such as asphalt. Typical treatments, though not the subject of the present invention, include oils, such as silicone oils, aqueous inorganic chemical solutions, such as solutions of magnesium chloride, and the like. One useful silicone oil is that known under the trade designation "Tegosivin HL15M7", an organosiloxane silicone oil, available from Goldschmidt Chemical, Hopewell, Va. Traditionally, slate oil, such as that available from Cross Oil & Refining Co. Inc., Smackover, Ark., has also been utilized for dust control.

Bituminous Sheet Materials

Bituminous sheet materials such as roofing shingles may be produced using pigmented algicidal granular materials in accordance with one preferred embodiment of the invention. Roofing shingles typically comprise a felt base upon which is applied a saturant or impregnant such as asphalt, which essentially entirely permeates the felt base. Typically, applied over the impegnated base is a waterproof or water-resistant coating, such as asphaltum, upon which is then applied a surfacing of mineral granules, which completes the conventional roofing shingle.

The surface may be comprised entirely of algae-resistant granules of the invention or, more preferably to reduce cost, combined with non-algae-resistant granules of the same or different color. As mentioned previously, one object of the invention is to match the color of non-algae-resistant granules to their algae-resistant counterparts.

The proportion of algae-resistant to non-algae-resistant granules may vary over a wide range, depending on the type of algae or fungi that is to be resisted or killed, the climate, the length of time the algicidal effect is to be, and the like. Generally, it has been found that granules of the invention have proved effective at retarding growth of algae when present on surfaces in finely devided form in amounts sufficient to provide at least about 1.5 kilogram per 10 square meters of roofing surface.

Method of Making Pigmented Algae-resistant Granules

The methods of making the granules of the invention are described in more detail in the examples. Briefly, the method comprises the steps coating inorganic substrate granules twice with one slurry containing cuprous oxide, with heating between the application of each component of the first slurry, to produce a double-ceramic-coated granule. The first slurry is produced by combining an alkali metal silicate, a high temperature reactive aluminosilicate, an algicidal amount of cuprous oxide, and a sufficient amount of water to render the slurry coatable onto granules, the high-temperature reactive aluminosilicate at least partially reactive with the alkali metal silicate. The first slurry is roughly at room temperature (about 20°–30° C.). Meanwhile, a plurality of inorganic substrate granules are preheated to about 125°–140° C., and the first slurry coated onto the substrate granules to form a plurality of first slurry-coated inorganic substrate granules at a temperature of about 50°–70° C. The granules are preheated so that most of the water in the slurry flashes off of the granules.

First slurry-coated inorganic substrate granules are then heated in an atmosphere for a time and at a temperature sufficient to form a plurality of first ceramic-coated inorganic granules in which about 15-25 weight percent of the cuprous oxide has been converted to cupric oxide. The kiln firing temperature typically and preferably ranges from about 490° to about 510° C., more preferably from about 495° to about 505° C. The amount of oxygen in the combustion air is an important control parameter, since a specific amount of cuprous oxide is oxidized to form black cupric oxide, and thus achieve the desired color granules. The amount of oxygen present in combustion air is commonly expressed in terms of "excess oxygen" or "excess air", or that amount of oxygen or air which is in excess of the amount theoretically necessary to completely combust the fuel. For the purposes of the present invention, if a relatively dark colored granule is desired, more cuprous oxide should be converted to cupric oxide, and the excess air should range from about 0 to about 10 volume percent. It also possible to adjust the amount and type of cuprous oxide loaded into the coatings to achieve a desired color tinting, where it is understood that the main control over color is the pigment used, not the cuprous oxide.

After kiln firing the granules are allowed to reach a temperature ranging from about 125° C. to about 140° C.; and the above steps repeated to provide a plurality of second ceramic-coated inorganic granules. These granules are allowed to reach a temperature ranging from about 110°-120° C., after which a second coatable slurry is coated onto the granules. The second slurry is provided by combining an alkali metal silicate, a second reactive aluminosilicate different from the high temperature aluminosilicate, a borate compound, and zinc oxide having an average particle size less than about 0.13 micrometer, more preferably less than about 0.1 micrometer, and a sufficient amount of water to render the slurry coatable onto granules. With the second slurry roughly at room temperature, the twice coated granules are coated with the second slurry to form a plurality of second slurry-coated inorganic granules at a temperature of about 50°-70° C. The second slurry coated granules are then heated a time and at a temperature sufficient to form a plurality of third ceramic-coated inorganic granules.

It is understood that other additives and pigments may be added to the slurries as desired. The slurries are typically applied to substrate granules with a mixer such as a tumbling-barrel type of mixer.

When coating the granules with the slurries, the granules and slurry are mixed for several minutes until the granules are evenly coated with the slurry, and then the slurry-coated substrate granules are dried with warm air until they have a free flowing consistency.

The invention will be further described with reference to the following Test Methods and Examples. In the following Examples, all parts, percentages, are by weight unless otherwise specified.

TEST METHODS

L*a*b* Scan Color Matching Test

Since color is the first stimulus that the consumer perceives, resulting in an immediate evaluation of roofing granule quality, color consistency is one of the principal quality attributes of roofing granules. To determine the color difference between algicidal and non-algicidal roofing granules, a machine known under the trade designation "HunterLab LabScan Spectrocolorimeter" model 6000 was used. A sample preparation device, which is described in U.S. Pat. No. 4,582,425, was used to prepare the samples.

The spectrocolorimeter is designed to measure the reflectance color of objects. The spectrocolorimeter measuring geometry used was 0°/45°. This geometry provided for viewing the samples similar to normal visual evaluation, with 0° illumination, or perpendicular illumination of the sample, in 45° viewing of the sample. 45° circumferential viewing effectively excludes the specular (glossy) reflectance. This geometry essentially eliminated the effect of the sample directionality or granule texture.

As explained in the HunterLab LabScan Spectrocolorimeter brochure, light from a halogen lamp passes through a series of filters and lenses to simulate D65 daylight and eliminate heat, and is focused on the sample in a circular pattern. (Roofing granular color was read in "Illuminant D65", which represents daylight with a correlated color temperature of approximately 6500° Kelvin.) Light diffusely reflected from the sample is collected by sixteen fiber optic bundles staged circumferentially at 45° to the sample. The light input from all stations was averaged to eliminate errors caused by sample texture and directionality, and was then directed onto the circular variable filter which was spun continuously, separating the light into its component wavelengths. The separated light was picked up by a single photo detector, and then fed to a personal computer via an analog-to-digital converter. The computer processes measurement data at 10 nanometer intervals across the visual spectrum, from 400 to 700 nanometers.

For the color determination tests, the 10° CIE Standard Observer (CIE stands for the Commission International de l'Eclairage, an international commission on illumination). The "Standard Observer" is the spectral response characteristic of the average observer defined by the CIE. Two such sets of data are defined, the 1931 data for the 2° visual field (distance viewing) and the 1964 data for the annular 10° visual field (approximately arms length viewing). A much better agreement with the average visual assessment can be obtained by making use of the 10° standard observer, and thus this was the observer used in these tests.

For each color granule tested, a sample was scanned by the spectrocolorimeter. This scan produced a numerical description of the colored sample, a fingerprint, which never changes. However, since it does not consider the lighting condition and the observer, the CIE L*a*b* does not completely describe the visual appearance of the color. A mathematical means of translating fingerprints into a set of three numbers (XYZ), tristimulus values, was developed. The tristimulus values describe color as a normal observer sees it under a specific lighting condition.

Because the tristimulus values (XYZ) do not provide either uniform or logical estimates of perceived color intervals or color relationships, scales based on the CIE standard observer were transformed into the "opponent-colors" theory of color vision. The 1976 CIE L*a*b* is one such transformation. The opponent-colors theory maintains that the interaction between the eye and the brain decodes the experience of a color into three specific signals. One of these signals is lightness-darkness (L*), one is red-green (a*) and one is yellow-blue (b*). This color system was chosen for use in these tests because it is believed to be understandable by both the color scientist and the novice. Thus all instrument color readings were taken on a HunterLab LabScan Spectrocolorimeter, in Illuminant D65, with 10° observer, in 1976 CIE L*a*b* color space. All granular samples were red after an oil had been removed from the granules. The oil removal procedure is described in the following test procedure.

After the granules were deoiled, the granule preparation procedure of U.S. Pat. No. 4,582,425 was used. Briefly, this procedure consisted of loading a layout sample dish by slightly overfilling the dish with granules, compressing the granules into the dish with the flat surface of a layout tray, using only vertical pressure and no circular action. The loaded sample dish in each test was positioned on the layout device, matching the configuration, so that the sample dishes were in the locked position. A roll carriage was then gently lowered onto the sample dish, after which the roller is pulled back and forth across the surface on the face of the granules. It was found that twice across the surface produced the desired smooth, even, flat, and undented surface necessary for precise color readings. Excess granules fall over the sample dish edge.

The prepared granule sample dish was then placed into the instrument sample port. The sample surface was first examined to insure that the sample has not "popped" and lost its smooth level surface.

Two complete spectrocolorimeter readings (scans) were taken, completely emptying and repeating the layout procedure each time. The procedure was repeated until two readings consistent with each other to within less than 0.3 unit range were obtained. If not, the procedures were repeated with more attention to detail. All samples presented to the spectrocolorimeter for color difference determination were at ambient temperature (hot granules give inaccurate color readings, as well as wet granules). After deoiling the granules in accordance with the procedure explained below, the granules were in all cases read within four hours of deoiling. (Samples left in an uncontrolled condition may exhibit unwanted changes, and samples that have been deoiled and then left standing for a long period of time are not acceptable for spectrocolorimeter readings.)

In interpreting the results from the spectrocolorimeter, the opponent-color scales give measurements of color in units of approximate visual uniformity throughout the color solid. L* measures lightness and varies from 100 for perfect white, to zero for black, approximately as the eye would evaluate it. a* and b*, the chromaticity dimensions, give understandable designations of color as follows: a* measures redness when plus, grey when zero, and greenest when minus; and b* measures yellowness when plus, grey when zero, and blueness when minus. Acceptable opponent color scales for the algicidal granules of the present invention are when all three of L*, a* and b* are within +/−1.0 of the standard non-algicidal black roofing granules, more preferably within +/−0.5 of the L*, a* and b* measures of the non-algicidal roofing granules.

Target values for black granules of the invention are L*=21.4, a*=−0.01, and b*=−0.68, while target values for brown granules of the invention are L*=38.9, a*=12.4, and b*=16.7.

Deoiling Procedure

As explained previously, oil is frequently added to roofing granules as an adhesion medium between the asphalt and granule as well as for reducing dust generation during processing of the granules. For quality control, exposed color is the most critical feature; therefore, the exposed color must be assimilated through the deoiling process. The deoiling procedure uses the following equipment:

deoiling funnel,
1,1,1-trichloroethane,
100 milliliter beakers,
distilled water,
vent hood,
vented oven,
screens (Tyler 14 and 20),
timer,
screen brush,
one gallon can,
stirring rod, and
white paper towels.

A sample of oiled granules was first screened to mesh size −14/+20. The screened sample was then placed in a 100 milliliter beaker, the granules filling up to 50 milliliters of a beaker. The beaker was then filled to the rim with 1,1,1-trichloroethane. The granules and trichloroethane were then allowed to sit undisturbed for about five minutes. The granules and trichloroethane were then poured into a deoiling funnel and the solvent drained without stirring into a one gallon can. Next, the funnel was filled with distilled water to the rim and stirred while draining, being sure to collect all solvent and water for proper disposal. The remaining granule samples in the funnel were placed on a white paper towel and dried in a vented oven. The temperature of the oven depended on how long the result can be waited for. At temperatures ranging from about 80° C. to about 110° C., the samples merely needed to be taken out when dry. (At temperatures above 110° C., the samples must be closely watched and removed as soon as possible when dry or the color can be affected. Too long a drying time at a temperature below about 80° C. can result in some "blooming" which will also affect spectrocolorimeter results.) The temperature of the drying oven used for these examples was 150° C. Finally, the dried granules were cooled on paper towels to room temperature on a table top prior to making any color determinations.

Alkalinity Test

This test provided a measure of the unbound, soluble alkali metal content remaining in a ceramic coating made from reacting an alkali metal silicate and an aluminosilicate clay. The silicate binder reacts (when calcined at temperatures preferably between 350° C. and 500° C.) with an aluminosilicate clay, and the reaction product forms a water insoluble ceramic coating. The remaining soluble alkali metal (mostly typically in the form of NaCl or other alkali metal chloride) is an indirect measure of the extent of insolubilization of the ceramic coating.

For each test run, 100 grams of the granular materials to be tested were placed into 100 milliliters (ml) water in an Erlenmeyer flask. The water was brought to boil and boiled for a period of 5 minutes. 3 drops of phenolphthalein indicator (turning point pH=9) were added anytime during the 5 minutes. The water was then decanted into a second flask. Approximately 10 ml of fresh distilled water was then added onto the boiled granules and swirled, and this water then added to the second flask with the water that had already been decanted.

The decanted water was then titrated to end-point using a digital buret titration device commercially available from the Brinkmann Company. If the solution was pink immediately after addition of the indicator, that indicated the solution had a pH (negative base ten logarithm of the hydogen ion concentration) above 9.0, so the solution was titrated with acid, (sulfuric acid. (0.1N)). If the solution was not pink immediately after addition of the indicator, the solution had a pH less than 9.0, and thus needed to be titrated to end-point using a base, (0.1N sodium hydroxide).

The ml of acid or base required to reach end-point is called the "Alkalinity". The alkalinity is positive when using acid, negative when using base. To clarify this procedure, the following theoretical examples are offered:

Theoretical Example 1
100 grams of granular materials are prepared as above. The decanted solution is pink, and 1.4 ml of sulfuric acid is added to the solution to reach end-point (end-point is reached when the phenolphthalein indicator turns color from pink to clear).

The alkalinity for this example would be +1.4.

Theoretical Example 2
100 grams of granular materials are prepared as above. The decanted solution is clear, and requires 0.5 ml of NaOH to make the solution turn pink, thereby indicating end-point.

The alkalinity of this example would be −0.50.

For granular materials of the invention, any alkalinity result between −2.0 and +2.0 is acceptable. In general, alkalinity values that are less than 0.2 units apart are considered to be essentially the same value.

Oxidation Test

This test provided a means to determine how a pigmented granule might change in $L^*$ value (light-dark) after exposure to a flowing stream of oxygen. This is used as an accelerated test to determine how the granules might fare after prolonged exposure to atmosphereic conditions.

The oxidation test was performed with a test machine known under the trade designation "Plasmod", from March Company, Concord, Calif. The device consisted of an inner and an outer chamber. Sample to be tested were placed in ceramic crucibles and the crucibles placed in the inner chamber, ensuring that the inner chamber was fully installed in the outer chamber. The door of the outer chamber was then closed. A vacuum pump was then engaged, which was allowed to pump down a vacuum in the inner chamber for about 1 minute, or until the vacuum guage read 200–300 torr. At this point, pure oxygen from a pressurized cylinder was admitted to the inner chamber through a regulator and allowed to flow through the chamber at a rate of about 2.5 SCFM, or until the pressure in the inner chamber was about 1000 torr. The oxygen, sample, and all equipment were at room temperature.

A radio frequency (RF) generator adapted to generate an RF signal of about 13.56 MHz was then started in order to generate an oxygen plasma inside the inner chamber. The RF signal was continued for 10 minutes, after which one sample was removed from the chamber and tested for $L^*$. After 80 minutes a second sample was removed from the oxidation test device, after which an $L^*$ reading was taken and recorded.

X-ray Diffraction Analysis

In order to determine how much of the cuprous oxide had been oxidized to cupric oxide in the course of the three-coat firing process, x-ray diffraction studies were performed on the granules before and after the firing of the granules. An x-ray diffractometer known under the trade designation "APD-3600", from Philips Corporation, was utilized for this testing.

MATERIALS DESCRIPTION

The following materials are used in the Examples which follow:

$Cu_2O$ is cuprous oxide, available from American Cemet, Inc.

$Cr_2O_3$ is chromium oxide, available from American Cemet, Inc.

$TiO_2$ is titanium dioxide, available from Kerr-McGee Chemical Corporation, Oklahoma City, Okla.

ZnO is zinc oxide made by the French process, available from Zinc Corporation of America, Monac, Pa.

Borax is $Na_2B_4O_7 \cdot 10H_2O$, commercially available from Harcros Chemical, Inc. Little Rock, Ark.

Dover clay is a clay reactive with alkali metal silicate solutions, available form W. R. Grace, McIntyre, Ga., having the chemical formula $Al_2(Si_2O_5)(OH)_4$.

CB490 is carbon black kown under the trade designation "Black Pearls 490", from Cabot Corp.

CB130 is carbon black kown under the trade designation "Black Pearls 130", from Cabot Corp.

"Blancol N" is the trade designation for the sodium salt of sulfonated naphthalene-formaldehyde condensate available from Rhone-Poulenc Surfactants & Specialties, Cranbury, N.J.

"Tegosivin HL15M7" is an organosiloxane silicone oil, available from Goldschmidt Chemical, Hopewell, VI. slate oil, available from Cross Oil & Refining Co. Inc., Smackover, Ark.;

0.1N Hydrosulfuric Acid, available from American Scientific Products, Minneapolis, Minn.; and 0.1N NaOH, available from American Scientific Products, Minneapolis, Minn.

PROCEDURE FOR COATING GRANULES WITH FIRST AND SECOND CERAMIC COATINGS

The procedure used in the following examples for coating the granular materials of the invention and the comparative examples with first and second ceramic coatings was as follows:

First and second ceramic coatings: A first slurry was mixed using 60 parts kaolin clay, 70 parts cuprous oxide, 85 parts aqueous sodium silicate solution (39.4% solids, 2.75 ratio $SiO_2$ to $Na_2O$), and 30 parts water. In each case this slurry was mixed in a mixer at room temperature with a laboratory scale mixer for about 10 minutes. Grade #11 nepheline syenite granules (−10/+35 US mesh size) granules (i.e. 1065 micrometers average particle size) were preheated to 113° C. while tumbling through a rotary kiln at a rate of about 908 kg per hour. The first slurry was then coated onto the preheated granules by mixing the preheated granules and slurry in the mixer. The first slurry-coated granules were then transferred to a rotary kiln and fired at 510° C. with an excess oxygen in the kiln of about 10%. The second coating was applied to the first coated granules in like manner.

EXAMPLES

Example 1 and Comparative Example A: Black Granules

For Example 1, a second coating precursor slurry was prepared by mixing in a slurry pot with agitation 20 parts Dover clay, 43 parts sodium silicate having a 2.75 ratio, which was 39.4 percent solids, 20 parts water, 0.7 part CB490, 2.4 parts CB130, 0.12 part Blancol N, 2.7 parts $Cr_2O_3$, and 2.0 parts each of ZnO and borax. 2000 parts of twice coated granules as described in the PROCEDURE FOR COATING GRANULES WITH FIRST AND SECOND CERAMIC COATINGS were coated with the second slurry in a rotary mixer and then dried with a heated air gun while still in the mixer. The granules were then transferred to a rotary firing pot and fired to 512° C. for about 2 minutes, and then cooled to 177° C., then treated with 6 and 0.2 parts slate oil and silicone, respectively. The granules were then graded to −16/+20 US mesh (1000 micrometer average particle size), deoiled with 1,1,1-trichloroethane as per the procedure described above, and evaluated for color parameters with the spectrocolorimeter known under the trade designation "HunterLab Lab-Scan Spectrocolorimeter" Model 6000.

For Comparative Example A, single coated, non-algae-resistant granules were prepared by coating inorganic substrate granules with a slurry containing 7.5 parts Dover clay, 10 parts Snobrite clay, 32 parts sodium silicate (having a 2.75 ratio, which was 39.4 percent solids), 10 parts water, 0.8 part CB490, 0.9 parts CB130, and 0.07 part Blancol N dispersant. No copper compound, $Cr_2O_3$, ZnO, or borax were used used in this coating. The coated granules were kiln fired at 343° C., treated with 15 parts of a 30% solution of $AlCl_3$, 5 parts slate oil, and 0.13 part silicone, then deoiled according to the above procedure.

The $L^*a^*b^*$ data for granules made in accordance with Example 1 and Comparative Example A were as follows:

| | $L^*$ | $a^*$ | $b^*$ |
|---|---|---|---|
| Example 1 | +22.17 | −0.08 | −0.53 |
| Comp. Ex. A | +22.14 | −0.15 | −0.38 |

The alkalinity values were as follows:

| | 5 min. | 15 min |
|---|---|---|
| Example 1 | 0.6 | 1.0 |
| Comp. Ex. A | 0.90 | 1.64 |

Each of the granules of Example 1 and Comparative Example A were subjected to the Oxidation Test described previously. The oxidation testing values were as follows: for Example 1, at time=0, 10 and 80 minutes, $L^*$=20.8, 21.9, and 22.9, respectively; while for Comparative Example A, $L^*$=19.9, 24.0, and 27.1 for the same time exposures. It can be seen from this data that the fade-resistance of the inventive granules is much improved over that of Comparative Example A, but that the color parameters of the granules of Example 1 and Comparative Example A are within +/−0.5 for $L^*$, $a^*$, and $b^*$.

Example 2: Use of Cupric Sulfate Pentahydrate

Three-coat granules similar to those produced in Example 1 were produced only using cupric sulfate pentahydrate rather than cuprous oxide. The first and second coatings each employed the following: 15 grams kaolin clay; 10.8 grams cupric sulfate pentahydrate; 0.5 grams ZnO (French process); 63.5 grams sodium silicate solution; and 63.5 grams water, all in weight per kilogram of substrate granules. The third coating was exactly the same as used in Example 1. For the granules of Example 2, the following color values were obtained: $L^*$=54.4; $a^*$=−0.81; and $b^*$=3.16. The alkalinity (8 minute) was determined to be +2.75.

Various modifications and alterations of this invention will become apparent to those skilled in the art without departing from the scope of the invention, and it should be understood that this invention is not to be unduly limited to the illustrated embodiments set forth herein.

What is claimed is:

1. A long-term algae-resistant granule comprising an inorganic substrate granule and a ceramic coating, the ceramic coating comprising:
   a) a first ceramic layer comprising the reaction product of an alkali metal silicate and a first reactive aluminosilicate, cuprous oxide, and cupric oxide, said cuprous oxide present in an amount ranging from about 30 gms to about 40 gms per kg of said substrate granule, and said cupric oxide present in an amount ranging from about 5 gms to about 10 gms per kg of said substrate granule;
   b) a second ceramic layer substantially the same thickness as the first ceramic layer and comprising the reaction product of an alkali metal silicate and a second reactive aluminosilicate, cuprous oxide, and cupric oxide, said cuprous oxide present in an amount ranging from about 30 gms to about 40 gms per kg of said substrate granule, said cupric oxide present in an amount ranging from about 5 gms to about 10 gms per kg of said substrate granule; and
   c) a third ceramic layer having a thickness approximately 0.25 to 0.5 times the thickness of each of the first and second ceramic layers and comprising the reaction product of an alkali metal silicate and a third reactive aluminosilicate which is more reactive toward alkali metal silicates than said first and said second reactive aluminosilicates from about 0.5 to about 5 gms zinc oxide per kg of said substrate granule having an average particle size less than about 0.13 micrometer, a borate compound having approximately the same concentration as the zinc oxide, and a pigment present in sufficient amount to provide said granule with an $L^*$ delta of less than about 2.0 after an 80 minute standard oxidation test.

2. A granule in accordance with claim 1 wherein said pigment consists essentially of a mixture of carbon black, and from about 1.25 to about 1.75 gms chromium oxide per kg of said substrate granule.

3. A granule in accordance with claim 2 wherein said carbon black is present at an amount ranging from about 1.0 to about 3.0 gms per kg of said inorganic substrate.

4. An inorganic granule in accordance with claim 1 wherein said zinc oxide is present at at least 0.5 gm but no more than about 2.5 gms per kg of said substrate granule.

5. An inorganic granule in accordance with claim 4 wherein said borate compound is present at at least 0.5 gm but no more than about 2.5 gms per kg of said substrate granule.

6. A granular material in accordance with claim 1 wherein said pigment is selected from a group consisting of carbon black, titanium dioxide, chromium oxide, yellow iron oxide, phthalocyanine green, red iron oxide, metal ferrites, and mixtures of these.

7. A granular material in accordance with claim 1 wherein said alkali metal silicate comprises $Na_2O:SiO_2$ having a ratio of $SiO_2$ to $Na_2O$ ranging from about 1.4:1 to about 3.75:1.

8. A granular material in accordance with claim 1 which further includes a silicone on the outer surface of the granular material.

9. A granular material in accordance with claim 2 wherein said carbon black is present in an amount ranging from about 1.0 to about 2.0 gms per kg of said substrate granules, and said second aluminosilicate is present in amount ranging from about 7.5 gms to about 12.5 gms per kg of said substrate granule.

10. A granular material in accordance with claim 1 which exhibits a change in $L^*$ of less than about 2.0 in an 80 minute oxidation test.

11. A long-term algae-resistant granule comprising an inorganic substrate granule and a ceramic coating, the ceramic coating comprising:
a) a first ceramic layer comprising the reaction product of an alkali metal silicate and a first reactive aluminosilicate, a copper sulfate selected from cuprous sulfate and cupric sulfate pentahydrate, said copper sulfate present in an amount ranging from about 10 gms to about 40 gms per kg of said substrate granule;
b) a second ceramic layer substantially the same thickness as the first ceramic layer and comprising the reaction product of an alkali metal silicate and a second reactive aluminosilicate, a copper sulfate selected from cuprous sulfate and cupric sulfate pentahydrate, said copper sulfate present in an amount ranging from about 10 gms to about 40 gms per kg of said substrate granule; and
c) a third ceramic layer having a thickness approximately 0.25 to 0.5 times the thickness of each of the first and second ceramic layers and comprising the reaction product of an alkali metal silicate and a third reactive aluminosilicate which is more reactive toward alkali metal silicates than said reactive first and said second aluminosilicate, from about 1 to about 5 gms zinc oxide per kg of said substrate granule having an average particle size less than about 0.13 micrometer, a borate compound having approximately the same concentration as the zinc oxide, and a pigment present in sufficient amount to provide said granule with an $L^*$ delta of no more than about 2.0 after an 80 minute standard oxidation test.

12. A granule in accordance with claim 11 wherein said copper sulfate is cupric sulfate pentahydrate.

* * * * *